(12) United States Patent
Suenari et al.

(10) Patent No.: US 12,222,357 B2
(45) Date of Patent: Feb. 11, 2025

(54) AUTOMATIC ANALYZER

(71) Applicant: Hitachi High-Tech Corporation, Tokyo (JP)

(72) Inventors: Tsukasa Suenari, Tokyo (JP); Takenori Okusa, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 776 days.

(21) Appl. No.: 17/594,779

(22) PCT Filed: Feb. 25, 2020

(86) PCT No.: PCT/JP2020/007326
§ 371 (c)(1),
(2) Date: Oct. 29, 2021

(87) PCT Pub. No.: WO2020/230401
PCT Pub. Date: Nov. 19, 2020

(65) Prior Publication Data
US 2022/0214371 A1 Jul. 7, 2022

(30) Foreign Application Priority Data
May 16, 2019 (JP) .................. 2019-092704

(51) Int. Cl.
*G01N 35/02* (2006.01)
*G01N 35/04* (2006.01)

(52) U.S. Cl.
CPC ... *G01N 35/025* (2013.01); *G01N 2035/0422* (2013.01); *G01N 2035/0439* (2013.01)

(58) Field of Classification Search
CPC ... G01N 2035/0406; G01N 2035/0422; G01N 2035/0439; G01N 2035/0491;
(Continued)

(56) References Cited

U.S. PATENT DOCUMENTS

| | | | |
|---|---|---|---|
| 2004/0105783 A1 | 6/2004 | Yamazaki et al. | |
| 2016/0091519 A1 | 3/2016 | Ohfuchi et al. | |
| 2019/0310276 A1* | 10/2019 | Yamagata | B01L 3/523 |

FOREIGN PATENT DOCUMENTS

| | | |
|---|---|---|
| JP | 2004-45112 A | 2/2004 |
| JP | 2014126415 A * | 7/2014 |
| JP | 2016-70802 A | 5/2016 |

OTHER PUBLICATIONS

International Search Report (PCT/ISA/210) issued in PCT Application No. PCT/JP2020/007326 dated Apr. 21, 2020 with English translation (four (4) pages).
(Continued)

*Primary Examiner* — Jennifer Wecker
(74) *Attorney, Agent, or Firm* — Crowell & Moring LLP

(57) ABSTRACT

Provided is an automatic analyzer in which a linear movement unit and a rotational movement unit that access to a same location can be arranged in a same plane. The automatic analyzer includes a linear movement unit configured to access to an access point by a linear movement, a rotational movement unit configured to access to the access point by a rotational movement, and a control unit configured to control an operation of the linear movement unit and the rotational movement unit so that the linear movement unit and the rotational movement unit do not interfere with each other.

8 Claims, 6 Drawing Sheets

(58) Field of Classification Search
CPC .. G01N 35/025; G01N 35/04; G01N 35/1002; G01N 35/109
See application file for complete search history.

(56) References Cited

OTHER PUBLICATIONS

Japanese-language Written Opinion (PCT/ISA/237) issued in PCT Application No. PCT/JP2020/007326 dated Apr. 21, 2020 (three (3) pages).
International Preliminary Report on Patentability (PCT/IB/338 & PCT/IPEA/409) issued in PCT Application No. PCT/JP2020/007326 dated Jan. 15, 2021 (three (3) pages).

\* cited by examiner

[FIG. 1]
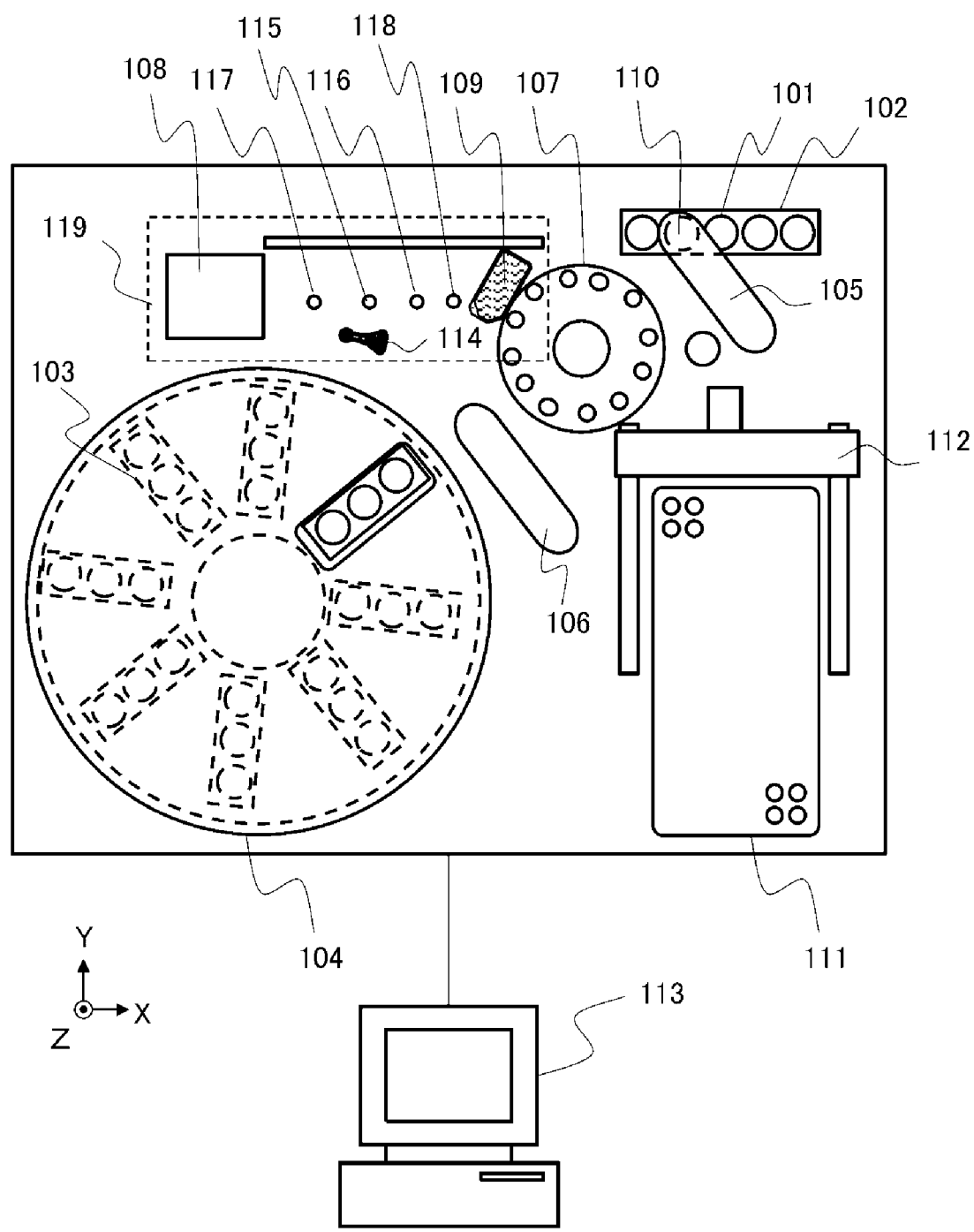

[FIG. 2]
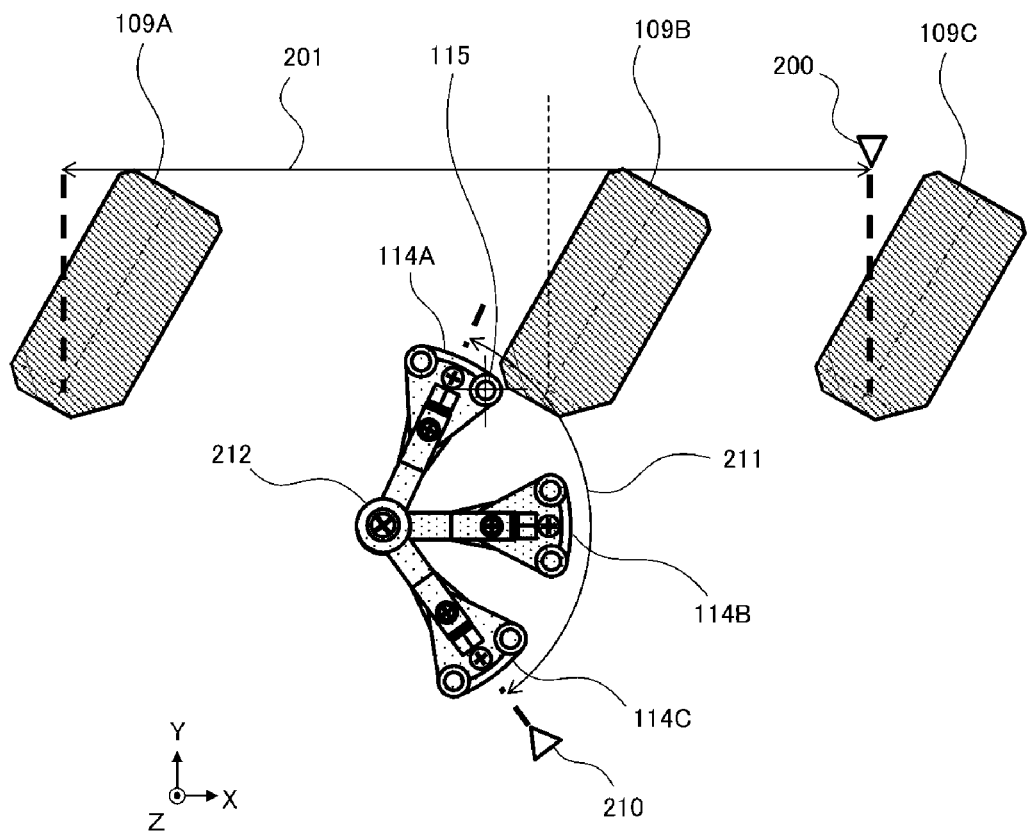

[FIG. 3]
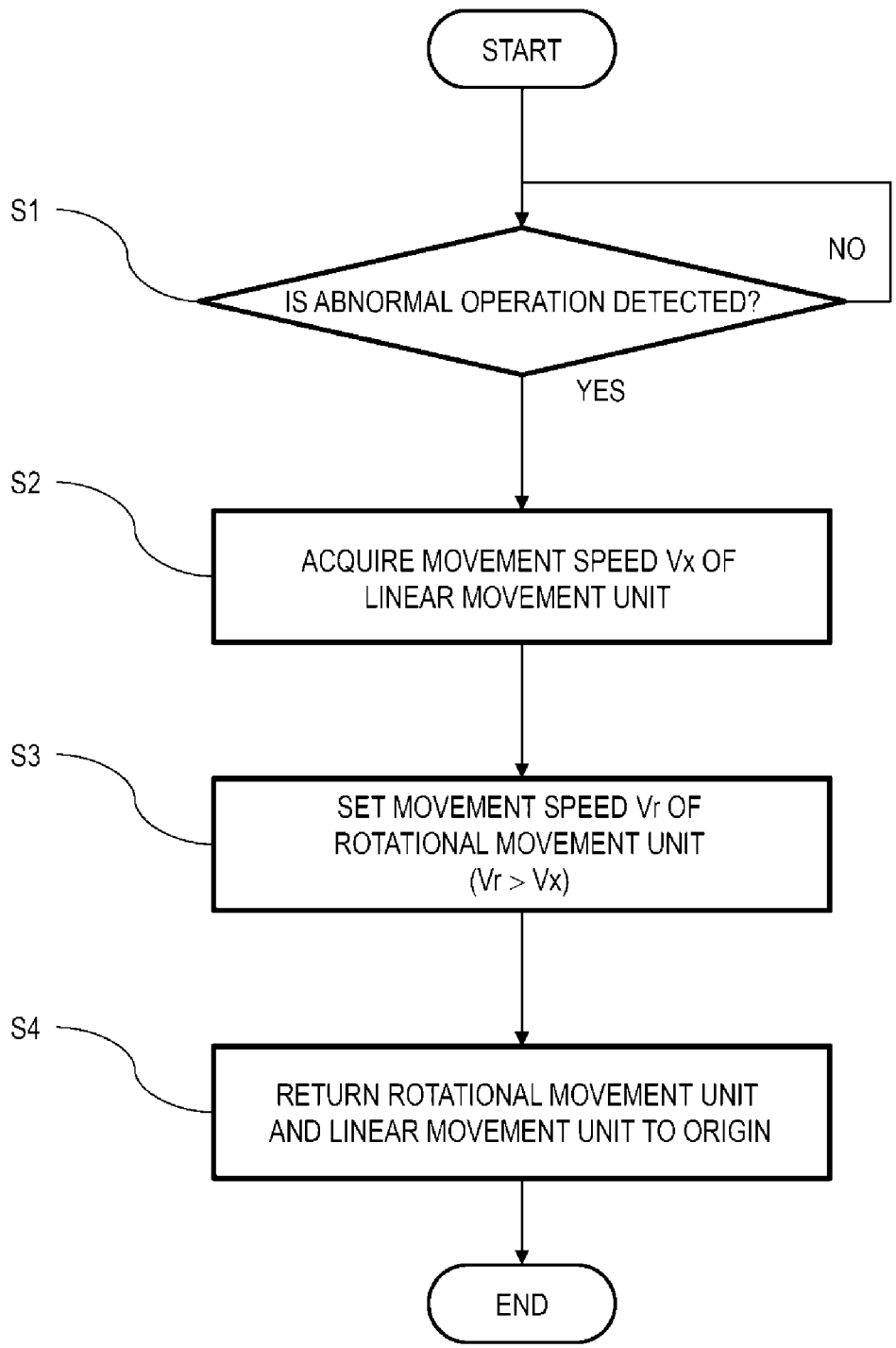

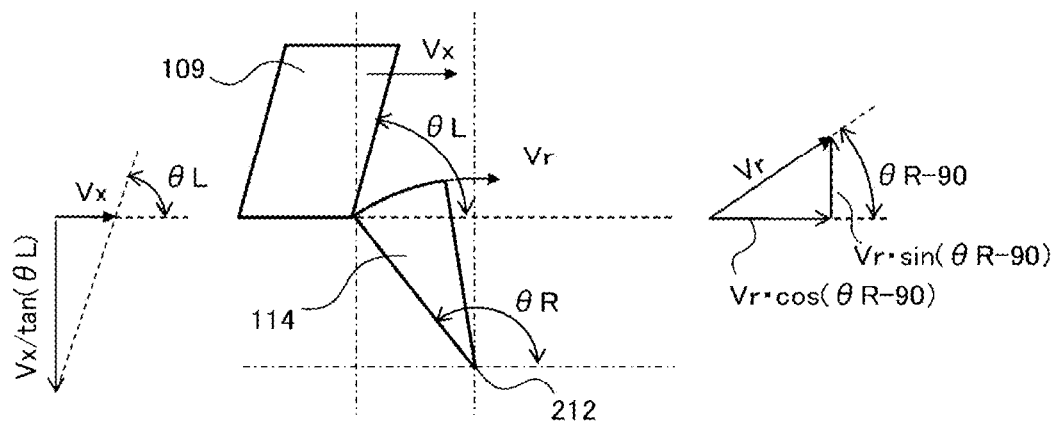
Fig. 4A
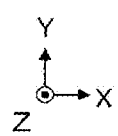
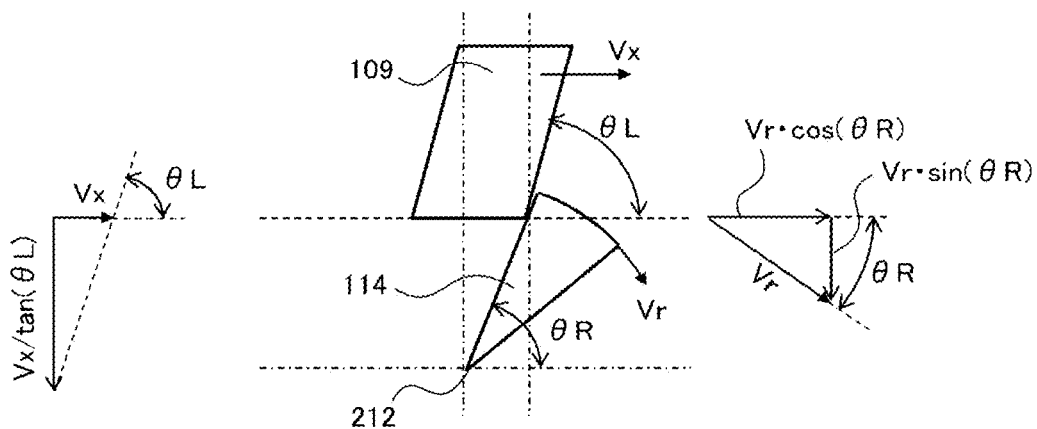
Fig. 4B

AUTOMATIC ANALYZER

TECHNICAL FIELD

The present invention relates to an automatic analyzer.

BACKGROUND ART

The automatic analyzer is a device for automatically quantitatively or qualitatively analyzing a specific component contained in a sample such as blood or urine. Automatic analyzers are required to perform a wide variety of inspections in a shorter time and in a smaller space.

Patent Literature 1 discloses an automatic analyzer including a reagent dispensing probe that moves along a rail connecting a plurality of reagent disks and accesses to the plurality of reagent disks to increase processing capacity even with a small size and a large number of reagents loaded.

CITATION LIST

Patent Literature

PTL 1: JP-A-2004-45112

SUMMARY OF INVENTION

Technical Problem

However, in PTL 1, since the reagent disk moving rotationally and the reagent dispensing probe moving linearly along the rail and accessing to the reagent disk are arranged at different heights, interference therebetween can be avoided, whereas space saving in a height direction is insufficient. The automatic analyzer includes a plurality of movement units that access to the same location from different directions, and also includes a space that requires a uniform temperature distribution. Thus, if the space saving in the space is insufficient, it is difficult to maintain a uniform temperature distribution.

Therefore, an object of the invention is to provide an automatic analyzer in which a linear movement unit and a rotational movement unit that access to the same location can be arranged in the same plane.

Solution to Problem

In order to achieve the above object, the invention provides an automatic analyzer including a linear movement unit configured to access to an access point by a linear movement, a rotational movement unit configured to access to the access point by a rotational movement, and a control unit configured to control an operation of the linear movement unit and the rotational movement unit so that the linear movement unit and the rotational movement unit do not interfere with each other.

Advantageous Effect

According to the invention, it is possible to provide an automatic analyzer in which a linear movement unit and a rotational movement unit that access to the same location can be arranged in the same plane.

BRIEF DESCRIPTION OF DRAWINGS

FIG. 1 is a plan view showing a configuration example of an automatic analyzer.

FIG. 2 is a plan view showing an arrangement of a reaction vessel transport unit (a linear movement unit), a preprocessing probe (a rotational movement unit), and a preprocessing position (an access point).

FIG. 3 is a diagram showing a processing flow of controlling an operation of the linear movement unit and the rotational movement unit.

FIGS. 4A and 4B are plan views showing a case where the rotational movement unit is provided frontward than the linear movement unit that is inclined forward with respect to a movement direction.

DESCRIPTION OF EMBODIMENTS

Figure 5A:
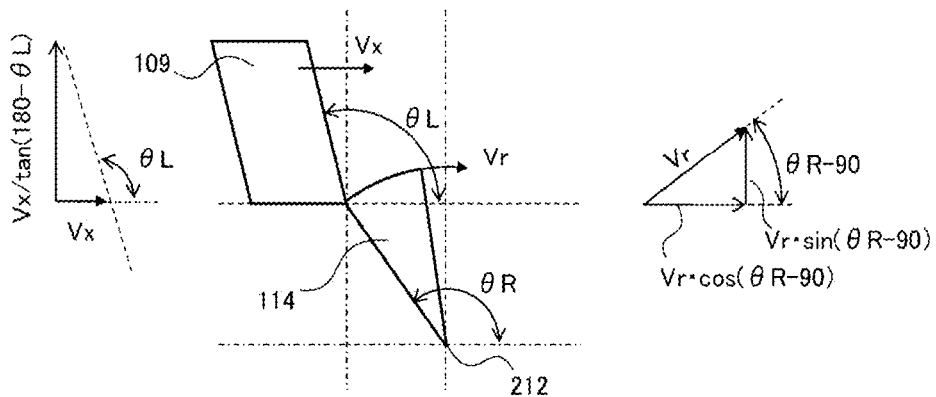
FIGS. 5A and 5B are plan views showing a case where the rotational movement unit is provided frontward than the linear movement unit that is inclined backward with respect to the movement direction.

Hereinafter, preferred embodiments of an automatic analyzer according to the invention will be described with reference to the accompanying drawings. The automatic analyzer is a device that analyzes a sample using a reaction liquid obtained by causing a reagent to react with a sample such as blood or urine with a reagent.

Embodiment 1

An example of an overall configuration of an automatic analyzer of the present embodiment will be described with reference to FIG. 1. The automatic analyzer includes a sample transport unit 102, a reagent disk 104, a sample dispensing unit 105, a reagent dispensing unit 106, a reaction disk 107, a reaction vessel transport unit 109, a preprocessing probe 114, a measurement unit 108, and a control unit 113. Hereinafter, each unit will be described. In addition, a vertical direction is defined as a Z direction, and a horizontal plane is defined as an XY plane.

The sample transport unit 102 transports a sample container 101 containing a sample such as blood or urine to a sample aspiration position 110. The reagent disk 104 stores a reagent container 103 containing a reagent used for analysis in a predetermined temperature range.

The sample dispensing unit 105 dispenses a sample from the sample container 101 transported to the sample aspiration position 110 to a reaction vessel arranged on the reaction disk 107. In addition, the reaction vessel into which the sample is dispensed and a dispensing chip used when dispensing the sample are stored in a consumable storage unit 111, and are transported to a predetermined position by a consumable transport unit 112. The reagent dispensing unit 106 dispenses a reagent from the reagent container 103 stored in the reagent disk 104 to the reaction vessel arranged on the reaction disk 107 and dispensed with the sample. The reaction disk 107 promotes a reaction between the sample and the reagent and produces a reaction liquid by maintaining the reaction vessel in which the sample and the reagent are dispensed within a predetermined temperature range.

The reaction vessel transport unit 109 transports the reaction vessel containing the reaction liquid from the reaction disk 107 to a reaction liquid dispensing position 117 via a preprocessing position 115 and a stirring position 116. At the preprocessing position 115, as a preprocessing for the reaction liquid contained in the reaction vessel, the preprocessing probe 114 aspirates an unnecessary liquid and discharges a buffer liquid. Next, the reaction liquid is stirred at the stirring position 116. Then, at the reaction liquid dispensing position 117, the reaction liquid is supplied from the reaction vessel to the measurement unit 108 by a probe for the measurement unit, which is not shown.

The measurement unit 108 measures physical properties of the supplied reaction liquid, for example, a light emission mount, a scattered light amount, a transmitted light amount, a current value, a voltage value, and the like. In addition, the physical properties to be measured are not limited to these. In addition, the measurement unit 108 may receive the reaction vessel from the reaction vessel transport unit 109 and measure the physical properties of the reaction liquid while being contained in the reaction vessel. The reaction vessel containing the reaction liquid of which the physical properties have been measured by the measurement unit 108 is transported to a disposal outlet 118 by the reaction vessel transport unit 109 and discarded. In addition, the discarded reaction vessel may be washed and reused.

The control unit 113 is a device that controls each unit included in the automatic analyzer, and is implemented by, for example, a computer.

The reaction disk 107, the preprocessing probe 114, the preprocessing position 115, the stirring position 116, the reaction liquid dispensing position 117, the measurement unit 108, and the reaction vessel transport unit 109 are covered with a thermal insulation cover 119 made of a thermal insulation material. In order to maintain the accuracy of the measurement result by the measurement unit 108, a space inside the thermal insulation cover 119 is adjusted to a predetermined temperature. If the space covered by the thermal insulation cover 119 becomes wide, it becomes difficult to maintain a uniform temperature distribution, and the time required for reaching a set temperature, that is, the time required for the measurement unit 108 to start the measurement becomes long. Therefore, it is desirable to save space in the thermal insulation cover 119.

In addition, since both the reaction vessel transport unit 109 and the preprocessing probe 114 provided in the thermal insulation cover 119 access to the preprocessing position 115, it is necessary to avoid interference therebetween when arranging these two on the same plane for space saving. That is, the reaction vessel transport unit 109, which is a linear movement unit that accesses to the preprocessing position 115, which is a common access point, by a linear movement, and the preprocessing probe 114, which is a rotational movement unit that accesses to the preprocessing position 115 by a rotational movement, are arranged in the same plane, and are not interfered with each other.

An example of an arrangement of the reaction vessel transport unit 109, the preprocessing probe 114, and the preprocessing position 115 according to the present embodiment will be described with reference to FIG. 2. The reaction vessel transport unit 109 accesses to the preprocessing position 115, which is the access point, in a linearly moving process within a linear movement range 201, and waits at an origin when not transporting the reaction vessel. A linear movement unit origin sensor 200 is provided at the origin of the reaction vessel transport unit 109, and the linear movement unit origin sensor 200 detects whether the reaction vessel transport unit 109 is waiting at the origin. By providing at least the linear movement unit origin sensor 200 as a sensor for detecting the position of the reaction vessel transport unit 109, cost reduction and simple system design can be achieved. FIG. 2 exemplifies a reaction vessel transport unit 109A at one end of the linear movement range 201, a reaction vessel transport unit 109C at the origin, and a reaction vessel transport unit 109B between these two. In addition, the reaction vessel transport unit 109 has a shape that is inclined forward with respect to a direction of returning to the origin.

The preprocessing probe 114 accesses to the preprocessing position 115 by moving rotationally around a rotation center 212 as a rotation axis within a rotational movement range 211, and waits at an origin when not accessing to the preprocessing position 115. A rotational movement unit origin sensor 210 is provided at the origin of the preprocessing probe 114, and the rotational movement unit origin sensor 210 detects whether the preprocessing probe 114 is waiting at the origin. By providing at least the rotational movement unit origin sensor 210 as a sensor for detecting the position of the preprocessing probe 114, cost reduction and simple system design can be achieved. FIG. 2 exemplifies a preprocessing probe 114A at the preprocessing position 115, which is one end of the rotational movement range 211, a preprocessing probe 114C at the origin, and a preprocessing probe 114B between these two.

The reaction vessel transport unit 109 and the preprocessing probe 114 arranged as shown in FIG. 2 are controlled by the control unit 113 so that the reaction vessel transport unit 109 and the preprocessing probe 114 do not interfere with each other based on the movement distances from the origins during a normal operation. However, the reaction vessel transport unit 109 and the preprocessing probe 114 may interfere with each other when returning to the origins when the reaction vessel transport unit 109 or the preprocessing probe 114 stops at a position where the control unit 113 cannot recognize due to an operator touching the reaction vessel transport unit 109 or the preprocessing probe 114 or the like. Therefore, in the present embodiment, control is performed so that the reaction vessel transport section 109 and the preprocessing probe 114 can return to the origins without interfering with each other regardless of the position at which the reaction vessel transport section 109, which is the linear movement unit, and the preprocessing probe 114, which is the rotational movement unit, stop.

An example of a processing flow of controlling the operation of the linear movement unit and the rotational movement unit according to the present embodiment will be described with reference to FIG. 3.

(S1)

The control unit 113 controls the operation of each unit of the automatic analyzer, and the control unit 113 controls the reaction vessel transport unit 109, which is the linear movement unit, and the preprocessing probe 114, which is the rotational movement unit, so that the reaction vessel transport unit 109 and the preprocessing probe 114 do not interfere with each other. When receiving an instruction for a certain operation, the control unit 113 first instructs a reset operation of each mechanism. That is, by performing an origin return operation before starting all of the operations, it is possible to return to the origin position and start a normal operation even after an abnormal operation.

(S2)

The control unit 113 acquires a movement speed Vx at which the reaction vessel transport unit 109, which is the linear movement unit, returns to the origin. The movement speed Vx may be stored in advance in a storage unit or the like included in the control unit 113.

(S3)

The control unit 113 sets a movement speed Vr at which the preprocessing probe 114, which is the rotational movement unit, returns to the origin, based on the movement speed Vx. For example, the movement speed Vr is set to be larger than the movement speed Vx. In addition, the movement speed Vr is a speed in a circumferential direction of a tip end portion of the rotational movement unit.

(S4)

The control unit 113 linearly moves the linear movement unit at the movement speed Vx, and rotationally moves the rotational movement unit at the moving speed Vr to return the linear movement unit and the rotational movement unit to respective origins. In addition, the linear movement unit has a shape with an opening space in a movement direction of the rotational movement unit. Since the linear movement unit has the opening space in the movement direction of the rotational movement unit, and the rotational movement unit moves at a speed larger than that of the linear movement unit, the linear movement unit and the rotational movement unit can return to the origins without interfering with each other. Hereinafter, detailed conditions for avoiding the interference between the linear movement unit and the rotational movement unit will be described.

A condition under which the linear movement unit and the rotational movement unit return to the origins without interfering with each other when the reaction vessel transport unit 109, which is the linear movement unit, has a shape that is inclined forward with respect to the direction of returning to the origin, and the preprocessing probe 114, which is the rotational movement unit, is provided frontward than the linear movement unit, will be described with reference to FIG. 4. In addition, when the reaction vessel transport unit 109 has the shape that is inclined forward with respect to the direction of returning to the origin, an angle θL formed by a wall on the origin side of the reaction vessel transport unit 109 and the movement direction is less than 90°. In addition, when the rotation angle of the preprocessing probe 114 around the rotation center 212 is an angle θR formed by a wall opposite to the origin of the preprocessing probe 114 and the movement direction of the reaction vessel transport unit 109, (a) of FIG. 4 is a plan view when θR≥90°, and (b) of FIG. 4 is a plan view when θR<90°.

In the case of (a) of FIG. 4, by making an X-direction component Vr·cos(θR−90) of the movement speed of the preprocessing probe 114 larger than the movement speed Vx of the reaction vessel transport unit 109, the interference in the X direction can be avoided, whereas the preprocessing probe 114 and the reaction vessel transport unit 109 interfere with each other in the Y direction. That is, a vector of the Y-direction component Vr·sin(θR−90) of the movement speed of the preprocessing probe 114 is a direction toward the reaction vessel transport unit 109 having a shape that is inclined forward with respect to the movement direction, and thus the interference in the Y direction occurs. In other words, since the reaction vessel transport section 109, which is the linear movement unit, does not have the opening space in the movement direction of the preprocessing probe 114, which is the rotational movement unit, the reaction vessel transport section 109 and the preprocessing probe 114 interfere with each other.

On the other hand, in (b) of FIG. 4, the vector of the Y-direction component Vr·sin(θR) of the movement speed of the preprocessing probe 114 is the direction away from the reaction vessel transport unit 109, and the reaction vessel transport unit 109 has the opening space in the movement direction of the preprocessing probe 114. Therefore, the interference between the preprocessing probe 114 and the reaction vessel transport unit 109 can be avoided by moving the preprocessing probe 114 in both the X and Y directions at a speed larger than that of the reaction vessel transport unit 109. Specifically, Vr·cos(θR)>Vx is satisfied in the X direction and Vr·sin(θR)>Vx/tan(θL) is satisfied in the Y direction.

A condition under which the linear movement unit and the rotational movement unit return to the origins without interfering with each other when the reaction vessel transport unit 109, which is the linear movement unit, has a shape that is inclined backward with respect to the direction of returning to the origin, and the preprocessing probe 114, which is the rotational movement unit, is provided frontward than the linear movement unit, will be described with reference to FIG. 5. In addition, when the reaction vessel transport unit 109 has the shape that is inclined backward with respect to the direction of returning to the origin, an angle θL formed by a wall on the origin side of the reaction vessel transport unit 109 and the movement direction is 90° or more. In addition, similar to FIG. 4, (a) of FIG. 5 is a plan view when θR≥90°, and (b) of FIG. 5 is a plan view when θR<90°.

Figure 5B:
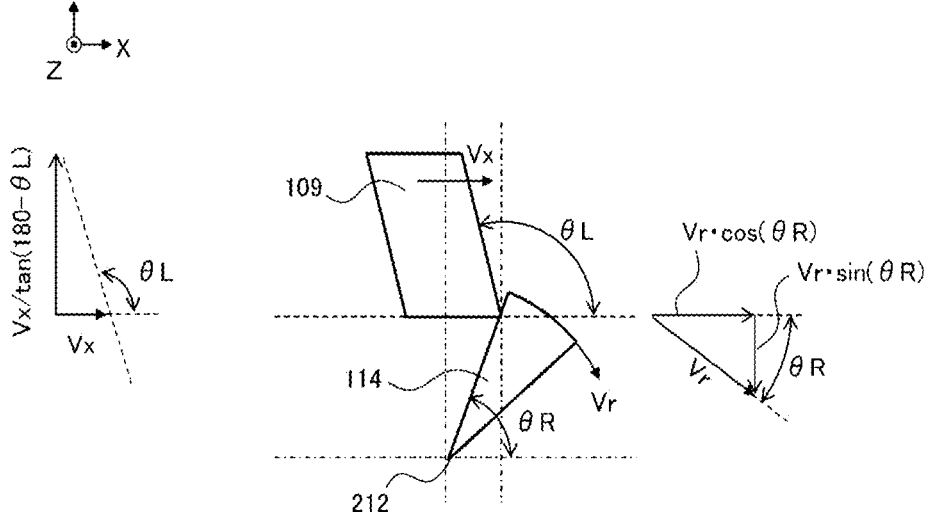

In (a) of FIG. 5, the reaction vessel transport unit 109 has the shape that is inclined backward, and thus the reaction vessel transport unit 109 has the opening space in the direction of the vector of the Y-direction component Vr·sin(θR−90) of the movement speed of the preprocessing probe 114. Therefore, the interference between the preprocessing probe 114 and the reaction vessel transport unit 109 can be avoided by moving the preprocessing probe 114 in both the X and Y directions at a speed larger than that of the reaction vessel transport unit 109. Specifically, Vr·cos(θR−90)>Vx is satisfied in the X direction, and Vr·sin(θR−90)>Vx/tan(180−θL) is satisfied in the Y direction.

In addition, in (b) of FIG. 5, the reaction vessel transport unit 109 has a shape that is inclined backward, and the preprocessing probe 114 moves in the direction away from the reaction vessel transport unit 109 in the Y direction, and thus the reaction vessel transport unit 109 has the opening space in the movement direction of the preprocessing probe 114. Therefore, the interference between the preprocessing probe 114 and the reaction vessel transport unit 109 can be avoided by moving the preprocessing probe 114 in the X direction at a speed larger than that of the reaction vessel transport unit 109, that is, Vr·cos(θR)>Vx.

A case where the preprocessing probe 114, which is the rotational movement unit, is provided backward than the reaction vessel transport unit 109, which is the linear movement unit, will be described with reference to FIG. 6. In addition, (a) of FIG. 6 is a plan view showing a case where the reaction vessel transport unit 109 has a shape that is tilted forward, and (b) of FIG. 6 is a plan view showing a case where the reaction vessel transport unit 109 has a shape that is tilted backward.

Figure 6A:
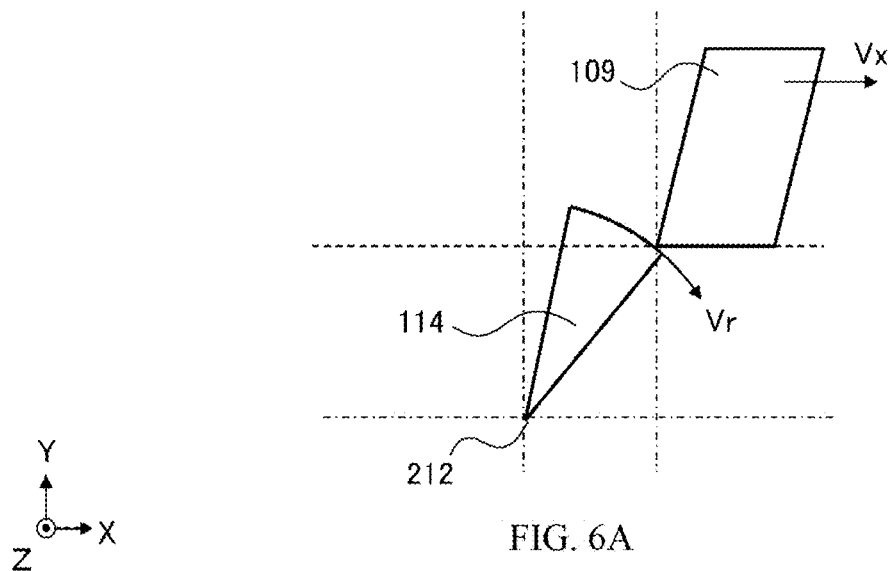
FIGS. 6A and 6B are plan views showing a case where the rotational movement unit is provided backward than the linear movement unit.
Figure 6B:
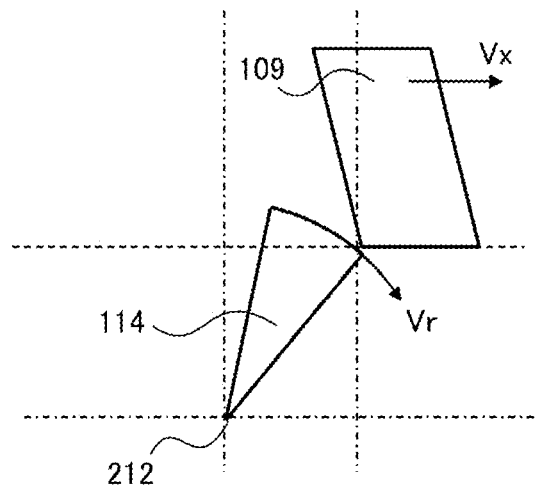

In both cases of (a) and (b) of FIG. 6, the preprocessing probe 114 moves in the direction away from the reaction vessel transport unit 109 in the Y direction, and thus the reaction vessel transport unit 109 has the opening space in the movement direction of the preprocessing probe 114. The preprocessing probe 114 moves in the direction approaching the reaction vessel transport unit 109 in the X direction. Therefore, a notch as shown in FIG. 2 may be provided on the wall opposite to the origin of the reaction vessel transport unit 109 so that the reaction vessel transport unit 109 has the opening space in the movement direction of the preprocessing probe 114. The interference between the preprocessing probe 114 and the reaction vessel transport unit 109 can be avoided by having the opening space in the movement direction of the preprocessing probe 114 and moving the preprocessing probe 114 at a speed larger than that of the reaction vessel transport unit 109.

In addition, as shown in FIG. 2, it becomes easy to form the opening space of the reaction vessel transport unit 109 by limiting the rotational movement range 211 of the preprocessing probe 114 such that the rotation angle θR of the preprocessing probe 114 when accessing to the preprocessing position 115 is less than 90°. In a case where the reaction vessel transport unit 109 has the opening space in the movement direction of the preprocessing probe 114, when the abnormal operation is detected, the reaction container transport unit 109 may be returned to the origin after the preprocessing probe 114 is returned to the origin.

Embodiments of the invention are described above. The invention is not limited to the above embodiments, and the constituent elements may be modified without departing from the scope of the invention. In addition, a plurality of constituent elements disclosed in the above embodiments may be appropriately combined. Furthermore, some constituent elements may be omitted from all the constituent elements shown in the above embodiments.

REFERENCE SIGN LIST

101: sample container
102: sample transport unit
103: reagent container
104: reagent disk
105: sample dispensing unit
106: reagent dispensing unit
107: reaction disk
108: measurement unit
109: reaction vessel transport unit (linear movement unit)
110: sample aspiration position
111: consumable storage unit
112: consumable transport unit
113: control unit
114: preprocessing probe (rotational movement unit)
115: preprocessing position (access point)
116: stirring position
117: reaction liquid dispensing position
118: disposal outlet
119: thermal insulation cover
200: linear movement unit origin sensor
201: linear movement range
210: rotational movement unit origin sensor
211: rotational movement range
212: rotation center

The invention claimed is:

1. An automatic analyzer, comprising:
a linear movement unit configured to access to an access point by a linear movement;
a rotational movement unit configured to access to the access point by a rotational movement; and a control unit configured to control an operation of the linear movement unit and the rotational movement unit so that the linear movement unit and the rotational movement unit do not interfere with each other, wherein the control unit is configured to set a movement speed of the rotational movement unit to be larger than a movement speed of the linear movement unit, and wherein the control unit is configured to return the linear movement unit to a first origin, and return the rotational movement unit to a second origin different from the first origin, and the linear movement unit is configured to linearly move only in a direction of a straight line connecting the first origin and the access point.

2. The automatic analyzer according to claim 1, wherein the movement speed of the linear movement unit is a speed at which the linear movement unit returns to the first origin, and
the movement speed of the rotational movement unit is a speed in a circumferential direction at which a tip end portion of the rotational movement unit returns to the second origin.

3. The automatic analyzer according to claim 2, wherein the linear movement unit has a shape that is inclined backward in a direction returning to the first origin, and the rotational movement unit is provided frontward than the linear movement unit.

4. The automatic analyzer according to claim 1, wherein the linear movement unit has a shape with an opening space in a movement direction within a rotational movement range of the rotational movement unit.

5. The automatic analyzer according to claim 4, wherein when the control unit is configured to detect an abnormal operation of the linear movement unit or the rotational movement unit, the control unit is configured to return the rotational movement unit to an origin, and then returns the linear movement unit to an origin.

6. The automatic analyzer according to claim 1, wherein the linear movement unit is a reaction vessel transport unit that transports a reaction vessel containing reaction liquid,
the rotational movement unit is a preprocessing probe that performs preprocessing on the reaction liquid, and
the access point is a preprocessing position where the reaction vessel transport unit transports the reaction vessel and the preprocessing probe performs the preprocessing.

7. The automatic analyzer according to claim 1, wherein the control unit is configured to, when a position where the linear movement unit or the rotational movement unit is stopped is not recognizable, return the linear movement unit to the first origin and return the rotational movement unit to the second origin.

8. The automatic analyzer according to claim 1, wherein a rotation angle of the rotational movement unit when rotationally moving between the access point and the second origin is less than 90 degrees.

* * * * *